Sept. 4, 1934.   R. E. ANNEREN   1,972,815
AUTOMATIC CONTROL DEVICE
Filed Oct. 30, 1928
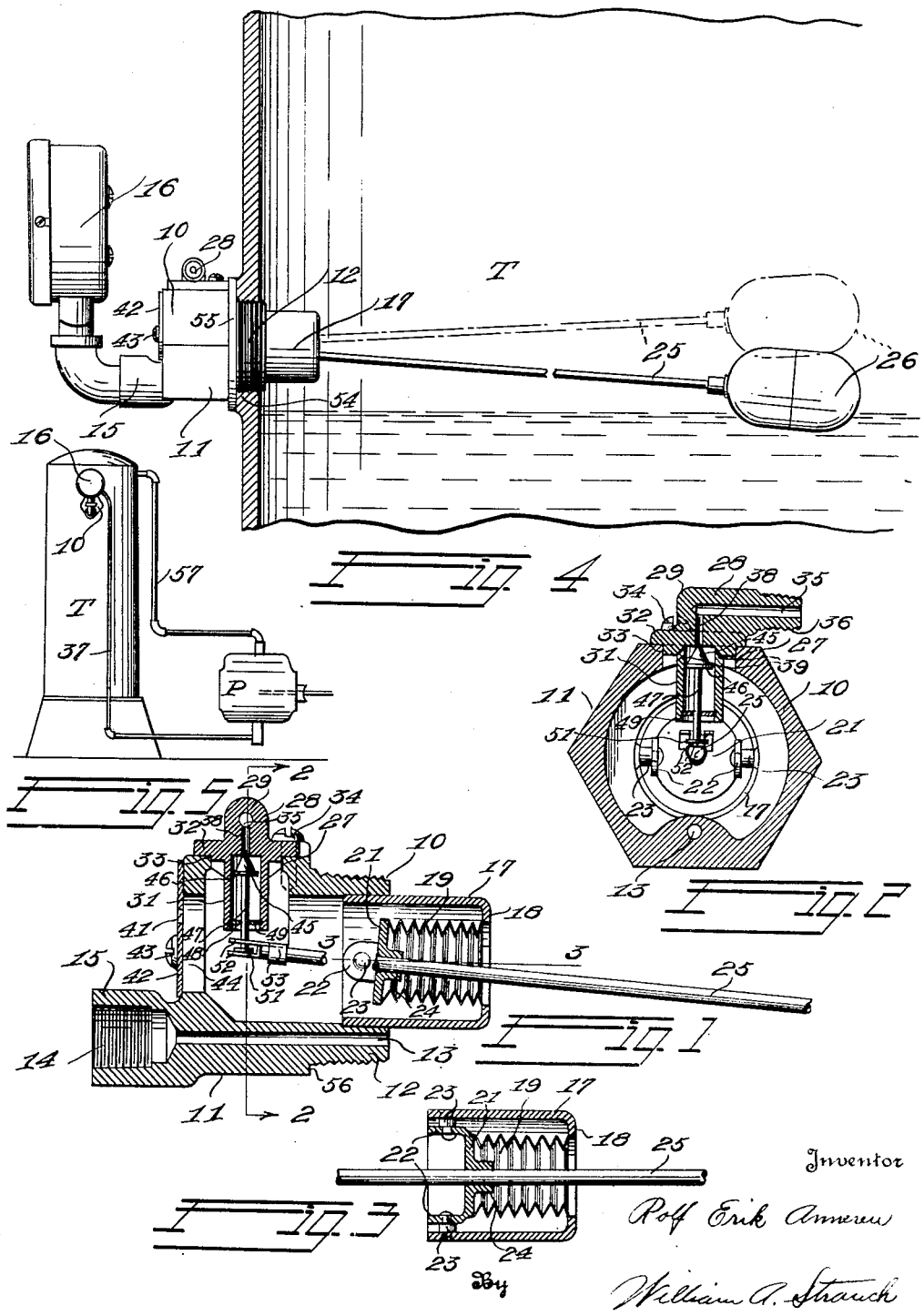

Patented Sept. 4, 1934

1,972,815

UNITED STATES PATENT OFFICE 1,972,815

AUTOMATIC CONTROL DEVICE

Rolf Erik Anneren, Sellersville, Pa., assignor to United States Gauge Company, New York, N. Y., a corporation of Pennsylvania Application October 30, 1928, Serial No. 316,041

6 Claims. (Cl. 137—68)

The present invention relates to automatic control devices, and more particularly, the invention relates to a control device or mechanism for automatically maintaining a suitable volume of air or other gas in pressure tanks for water or other liquid distributing systems to force the water or liquid contained therein through surface pipes or distributing conduits associated therewith at predetermined pressures, or to maintain a predetermined liquid level in a chamber such for example as in the expansion chamber of a refrigerating system of the flooded type, or in steam boilers and the like.

For example, water distributing systems of the pneumatic pressure type usually embody an airtight storage or pressure tank into which water is intermittently pumped by a feed pump in a manner well known by those skilled in this art. In such systems, as water is pumped into the tank the air space therein is gradually reduced until the air trapped therein is compressed to a predetermined point at which it exerts a constant pressure on the water within the tank tending to force water from the tank through the distributing pipes or conduits.

The pumps used for forcing water into the tank are commonly provided with control means for automatically starting the pump when the pressure within the tank diminishes to a predetermined point as the air expands in forcing water out of the tank. The same control means automatically stops the pump upon restoration of a predetermined maximum pressure within the tank due to replacement of the water drawn therefrom.

In such systems of water distribution, a uniform supply of water under a substantially constant pressure for most effective operation could be maintained if a constant amount of air could be retained within the tank. However, as water is drawn from the tank some of the air escapes with the water and unless replaced the air within the tank gradually diminishes in volume with the result that a substantially constant pressure can be maintained for a comparatively short time only.

In large water supply systems of this character it has been common practice for an attendant to observe the volume of air forming the air cushion by means of a gauge mounted on the tank arranged to indicate the level of the water within the tank. In order to replenish the air supply it has been the practice to manually control an air inlet in the pump suction pipe in order that the pump may force air into the tank along with the water until the desired volume of air is restored in the tank as indicated by the gage.

In order to keep a system of this character in efficient operation it is necessary to keep the gauge under constant observation and even then it is impossible to maintain a uniform supply of water under a substantially constant pressure.

To eliminate the necessity for manual control of such systems, various forms of float controlled devices have been proposed for automatically controlling admission of air to the suction side of the pump through the walls of the tank. Such prior constructions have been of a more or less complicated construction, unsatisfactory and unreliable in operation, and require pressure packings around the elements extending through the tank walls which are subject to deterioration and difficult to maintain fluid tight in operation. Other constructions devised in an effort to avoid the packing and leakage troubles of these relatively complicated devices have proposed to magnetically operate the air control valve. Certain of these devices are unreliable, and are too uncertain in operation to permit successful commercial use.

In the expansion units of flooded type refrigerating systems using ammonia, sulphur dioxide, and like refrigerants, and in steam boilers, it is essential that no leaks of liquid or gas shall occur, and my invention is especially adapted for application as a liquid level control in such systems as will more fully hereinafter appear.

It is accordingly an object of this invention to provide improved, simplified and efficient controlling devices for automatically maintaining a uniform supply of water or liquid within a pressure tank under a substantially constant pressure for causing a substantially uniform flow as the water is withdrawn from the tank.

A further object of the invention is to provide automatic air or gas volume and liquid level control devices for association with water pressure tanks, refrigerator expansion units, water boilers and the like wherein the use of troublesome and complicated packing arrangements, stuffing boxes and the like are eliminated.

A further object of the invention is to provide a float controlled fluid valve or switch mechanism operating arrangement including a flexible element, member or diaphragm arranged to serve as a portion of the wall of a liquid containing chamber or space containing the controlled valve or switch mechanism said flexible element permitting relatively free movement of the float and operation of the valve or switch mechanism.

A still further object of the invention is to provide automatic air or gas volume and liquid level control devices of the character mentioned of comparatively simple construction, effective and accurate in operation, and which can be manufactured and installed at relatively low cost.

With these objects in view as well as others that will become apparent in the course of the following disclosure reference will be had to the accompanying drawing showing a preferred embodiment of the invention in which Fig. 1 is a substantially longitudinal sectional view through a preferred form of device embodying my invention.

Fig. 2 is a transverse sectional view on a plane indicated by line 2—2 in Fig. 1.

Fig. 3 is a horizontal sectional view on a plane indicated by line 3—3 in Fig. 1.

Fig. 4 is a fragmental sectional view of a pressure tank showing the invention in side elevation connected therewith.

Fig. 5 is a diagrammatic side elevational view of a water pressure tank and pump operatively associated therewith illustrating the application of my invention.

Referring to the drawing by reference characters in which like characters designate like parts of the various figures, 10 designates a housing preferably of cast iron, steel, bronze, or other suitable material, depending upon the nature of liquid or gases within the tank, and as illustrated comprises an angular tool engaging section 11 and a somewhat reduced externally threaded section 12. Housing 10 as illustrated may be provided in the base thereof with a bore 13 communicating at one end thereof with a threaded recess 14 in an extension 15 of housing 10 for the reception of a pressure gauge 16 which is preferably employed with the control device, but forms no part of my present invention.

Rigidly secured in the end of section 12 of housing 10 in any suitable manner is one end of a bushing 17 whose opposite end is inwardly flanged at 18. Soldered or otherwise fastened to the flange 18 is one end of a flexible bellows diaphragm 19 whose opposite end is similarly fastened to the margin of a disc 21. The disc 21 is provided with diametrically opposed longitudinally disposed ears 22 pivotally secured to the bushing 17 as indicated at 23 for permitting rocking movement of the disc 21. Extending through an aperture 24 in the central flanged portion of disc 21 and suitably secured therein as by soldering is a float rod 25, one end of which projects within housing 10 and the opposite end of which is provided with a float 26, the rod extending through bushing 17 and diaphragm 19 as indicated in Figs. 1 and 3.

Housing 10 is provided with an aperture 27 for the reception of a valve housing 28 which comprises an outer head member 29 and an inwardly directed open ended cylindrical member 31. Member 29 at the junction thereof with member 31 is provided with a flange 32 which is shouldered at 33 for accurate positioning of housing 28 within housing 10. A screw bolt 34, extending through flange 32 and into housing 10, serves to detachably connect housing 28 with housing 10.

Member 29, as indicated in Fig. 2, is of elongated formation and is provided with a bore 35 and is externally threaded at 36 for engagement of a pipe coupling for detachable connection of a pipe 37 (Fig. 5) whose opposite end is connected to the suction side of pump P. Member 29 is further provided with a vertically disposed bore 38 the outer end of which communicates with the inner end of bore 35. The inner end of bore 38 opens into cylindrical member 31 and is formed at its mouth to provide a valve seat. Member 31 adjacent the outer end thereof is provided with ports 39 which put the interior of member 31 into communication with the interior of housing 10 which is in communication with the atmosphere through an aperture 41 in a cover plate 42 detachably secured to housing 10 by bolts 43 for covering the assembling opening 44 therein.

Mounted within member 31 for vertical reciprocation is a valve structure comprising a conical valve 45 for cooperation with the valve seat defined by the mouth of bore 38 which at the base thereof is provided with a circular guiding flange 46. A valve stem 47 supporting valve 45 extends inwardly through a central guiding aperture 48 in a diaphragm 49 fixed within the inner end of member 31. The inner end of stem 47 is provided with a disk 51 for movement of rod 47 upon engagement of opposite sides thereof by extensions 52 of a clamp 53, secured to the adjacent end of float rod 25.

The control device above described is adapted for installation in the following manner. Valve housing 28 with valve 45 therein is assembled with housing 10 which has previously been provided with bushing 17, supporting diaphragm 19 and disc 21 whereupon clamp 53 is assembled with rod 25 and disc 51 through opening 44 with extensions 52 of clamp 53 disposed on opposite sides of disk 51 after which cover plate 42 is secured to housing 10 for closing opening 44.

Thus assembled the structure is now connected with a pressure tank T by screwing threaded section 12 of housing 10 into an internally threaded boss 54 of tank T as indicated in Fig. 4, a suitable gasket 55 preferably being interposed between a shoulder 56 on housing 10 and boss 54.

The float 26 being now connected to rod 25 pressure gage 16 is connected with housing 10 through extension 15 thereof, and liquid is allowed to enter the tank.

In operation, water is intermittently pumped into tank T by pump P through a pipe line 57 as indicated in Fig. 5, the pump being automatically started and stopped by means actuated by minimum and maximum pressures within the tank.

As illustrated in Figs. 1 and 4 float 26 due to a low level of water is in its lowermost position as a result of which valve 45 is closed through engagement of lower extension 52 with disc 51 due to the upward movement of clamp 53 through the rocking movement of rod 25 permitted by the pivotal connections 23 of disc 21 to which rod 25 is secured.

In the position of parts illustrated pump P by its separate control means is set into operation for pumping water into tank T whereupon the level of the water within the tank will gradually rise imparting an upward movement to float 26 which through the pivotal connection 23 of disc 21 will force clamp 53 downward whereupon the upper extension 52 will engage the upper side of disc 51 thus opening valve 45 and admitting air through ports 39 and 41, bores 38 and 35 and piping 37 into the suction side of pump P which air will be pumped with the water into tank T until a sufficient volume of air has been introduced into tank T to provide a sufficient air cushion to cause an effective operating pressure of the water within the tank.

When float 26 has been raised by an elevation of water within the tank T sufficient to open valve 45 the valve will remain open but the pump will be automatically stopped when a predetermined air pressure has been established. As the water level within the tank T falls, float 26 will likewise fall and valve 45 will be closed by engagement of lower extension 52 with disc 51 and when the pump is set into operation with the water level such that float 26 is in its lowermost position the already existing air pressure within the tank may be sufficient that float 26 will not rise to a distance sufficient to open valve 45 as in this case no air is required, but if the water level goes beyond this point a replenishing air supply is required and valve 45 is automatically opened by engagement of upper extension 52 with disc 51 upon rocking movement of rod 25.

It will accordingly be seen that an automatic air volume control device for water system pressure tanks is provided which is comparatively simple in construction, reliable and effective in operation, and in which the valve housing is completely protected from the water in the pressure tank by comparatively simple and efficient means that permits relatively free movement of the float rod whereby the usual packing or stuffing boxes which are a source of a great deal of trouble and tend to restrict movement of the valve rod are entirely eliminated. As a result this device maintains accurately a substantially constant air pressure on a substantially constant volume of water.

While the control device is disclosed in connection with pressure tanks for water distribution systems, it is equally applicable to refrigerating expansion units, steam boilers and the like for the purpose of replenishing the liquid therein and to maintain a liquid level within predetermined limits by causing valve 45 to control the flow of liquid into the tank rather than the flow of air to a pump. The valve 45 may also be replaced by a suitable electrical switch mechanism preferably of the snap acting type to control an electric motor drive for a liquid supply pump in a manner that will be apparent to those skilled in the art.

While I have disclosed certain specific embodiments of my invention such disclosure is to be considered as illustrative only and not restrictive, since the scope of the invention is defined in the subjoined claims. Accordingly, what I claim and desire to secure by U. S. Letters Patent is:

1. An automatic air volume control apparatus, comprising a fitting in the form of a housing provided with means to detachably secure it in an opening in a tank, a passage in said fitting that is normally open to atmosphere at one point and extends from that point through an element of said fitting designed for attachment to a conduit leading to means arranged to supply fluid to said tank, a valve to control the flow of air through said passage, an arm pivoted in said fitting for swinging movement about an axis transverse to the length of said arm and extending through a relatively large opening in the housing permitting free movement of said arm, an elongated float secured to the end of said arm so that the length thereof extends in the direction of the length of said arm, said float being of a sufficiently small diameter to permit its insertion rectilinearly through said opening in the tank, means disposed within said housing to mechanically directly connect said arm and said valve, and a wall flexible between said arm and the portions of said housing surrounding the last named opening to seal said opening without imposing substantial resistance to the actuation of said valve as said float moves in response to changes of liquid level in said tank.

2. An automatic air volume control apparatus, comprising a fitting in the form of a housing provided with means to detachably secure it in an opening in a tank, a passage in said fitting that is normally open to atmosphere at one point and extends through an element of said fitting designed for attachment to a conduit leading to means arranged to supply fluid to said tank, a valve to control the flow of air through said passage, an arm mounted in said fitting for swinging movement about an axis transverse to the length of said arm and extending through a relatively large opening in the housing permitting free movement of said arm, a float secured to said arm, means disposed within said housing to mechanically connect said arm and said valve and a cylindrical bellows between said arm and the wall of said housing surrounding the last named opening, providing a flexible means to seal said opening without imposing substantial resistance to the actuation of said valve as said float moves in response to changes of liquid level in said tank.

3. An automatic air volume control apparatus comprising a fitting in the form of a housing, provided with means to detachably secure it in an opening in a tank, a passage in said fitting that is normally open to atmosphere at one point and extends through an element of said fitting designed for attachment to a conduit leading to means arranged to supply fluid to said tank, a second passage in a wall of said housing opening into the interior of the tank at one end and arranged adjacent the opposite end to receive a pressure gauge, a valve in said housing to control the flow of air through said first named passage, a float arm mounted in said fitting, an elongated float secured to said arm with its length extending in the direction of the length of the arm, said float being of a diameter sufficiently small to permit it to be entered through said opening in the tank, means mechanically connecting said arm and said valve, and means to seal the opening in said housing through which said arm extends, said last named means permitting substantially free movement of said float.

4. An automatic air volume control apparatus comprising a fitting in the form of a housing, provided with means to detachably secure it in an opening in a tank, a passage in said fitting that is normally open to atmosphere at one point and extends through an element of said fitting designed for attachment to a conduit leading to means arranged to supply fluid to said tank, a second passage in a wall of said housing opening into the interior of the tank at one end and arranged adjacent the opposite end to receive a pressure gauge, a valve in said housing to control the flow of air through said first named passage, a float arm mounted in said fitting, an elongated float secured to said arm, said float being of a diameter sufficiently small to permit it to be entered through said opening in the tank, means mechanically connecting said arm and said valve, and means to seal the opening in said housing through which said arm extends, said last named means permitting substantially free actuation of said valve as said float moves in response to changes of liquid level in said tank.

5. In automatic ail volume control comprising a fitting provided with means to detachably secure it in an opening in a tank, a passage in said fitting that is normally open to atmosphere at one point and designed for communication with a conduit leading to means arranged to supply fluid to said tank, a second passage in said fitting opening into the interior of the tank at one end and arranged adjacent the opposite end to receive a pressure gauge, a valve to control the flow of air through said first named passage, a float arm mounted in said fitting, an elongated float secured to said arm with its length extending in the direction of the length of the arm, said float being of a diameter sufficiently small to permit it to be entered in a straight line through said opening in the tank, means to cause said arm to actuate said valve, and a flexible wall surrounding the float arm and extending between said arm and fitting and rigidly secured to said arm and fitting to seal the opening in the fitting through which said arm extends, without imposing substantial resistance to the actuation of said valve as said float moves in response to changes of liquid level in said tank, and bends said wall laterally.

6. In automatic air volume control comprising a fitting provided with means to detachably secure it in an opening in a tank, a passage in said fitting that is normally open to atmosphere at one point and designed for communication with a conduit leading to means arranged to supply fluid to said tank, a second passage in said fitting opening into the interior of the tank at one end and arranged adjacent the opposite end to receive a pressure gauge, a valve to control the flow of air through said first named passage, a float arm mounted in said fitting, an elongated float secured to said arm with its length extending in the direction of the length of the arm, said float being of a diameter sufficiently small to permit it to be entered in a straight line through said opening in the tank, means to cause said arm to actuate said valve, and a flexible metallic bellows rigidly secured to and surrounding said float arm and extending to the wall of the opening in the fitting through which the float arm passes and rigidly secured thereto, said bellows flexing laterally during the movement of said float arm as the float moves in response to changes of liquid level in said tank.

R. ERIK ANNEREN.

DISCLAIMER 1,972,815.—*Rolf Erik Anneren*, Sellersville, Pa. AUTOMATIC CONTROL DEVICE. Patent dated September 4, 1934. Disclaimer filed November 17, 1942, by the assignee, *United States Gauge Company*.

Hereby enters this disclaimer to claim 5 in said specification.

[*Official Gazette December 15, 1942.*]